(12) United States Patent
Yang et al.

(10) Patent No.: US 9,377,891 B2
(45) Date of Patent: Jun. 28, 2016

(54) TOUCH PANEL (71) Applicant: HTC Corporation, Taoyuan County (TW)

(72) Inventors: Tun-Chun Yang, Taoyuan County (TW); Chih-Jen Hu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 239 days.

(21) Appl. No.: 13/938,237

(22) Filed: Jul. 10, 2013

(65) Prior Publication Data

US 2015/0015800 A1    Jan. 15, 2015

(51) Int. Cl.
G06F 3/041    (2006.01)

(52) U.S. Cl.
CPC .... *G06F 3/0416* (2013.01); *G06F 2203/04107* (2013.01)

(58) Field of Classification Search
None
See application file for complete search history.

(56) References Cited

U.S. PATENT DOCUMENTS

| 8,952,921 | B2 * | 2/2015 | Huang et al. | 345/174 |
| 2005/0230757 | A1 * | 10/2005 | Nagasawa | G02F 1/136204 257/355 |
| 2007/0268243 | A1 * | 11/2007 | Choo | G02F 1/13338 345/104 |
| 2009/0225269 | A1 * | 9/2009 | Lu et al. | 349/158 |
| 2011/0169783 | A1 * | 7/2011 | Wang et al. | 345/176 |
| 2011/0261004 | A1 * | 10/2011 | Chen et al. | 345/174 |
| 2012/0103777 | A1 | 5/2012 | Kang | |
| 2015/0022728 | A1 * | 1/2015 | Yang et al. | 349/12 |

FOREIGN PATENT DOCUMENTS

| CN | 102830881 | 12/2012 |
| TW | M375934 | 3/2010 |
| TW | M406779 | 7/2011 |
| TW | 201327312 | 7/2013 |

OTHER PUBLICATIONS

"Office Action of Taiwan Counterpart Application", issued on Feb. 13, 2015, p. 1-p. 4.

* cited by examiner

*Primary Examiner* — Andrew Sasinowski
*Assistant Examiner* — Henok Heyi
(74) *Attorney, Agent, or Firm* — Jianq Chyun IP Office (57) ABSTRACT A touch panel is provided, including a substrate, a touch sensing array, a first electrostatic protection circuit, a first insulating layer and a plurality of first connecting lines. The substrate has an active region and a peripheral region surrounding the active region. The touch sensing array is disposed on the substrate and located in the active region. The first electrostatic protection circuit is disposed on the substrate and located in the peripheral region. The first insulating layer is disposed on the substrate and located in the peripheral region, wherein the first insulating layer covers the first electrostatic protection circuit. The plurality of first connecting lines is disposed on the first insulating layer and coupled to the touch sensing array respectively.

19 Claims, 8 Drawing Sheets

TOUCH PANEL

BACKGROUND OF THE INVENTION

1. Field of the Invention

The present application is related to a touch panel, and particularly to a touch panel having electrostatic protection functions.

2. Description of Related Art

As information technology, wireless mobile communication and information appliances are rapidly developing and applied, in order to achieve more convenient, more compact and light-volume and more user-friendly designs, many information products have changed from using conventional input devices such as keyboards or mice to using touch panels.

Based on the difference in sensing types, touch panels may be generally categorized into a resistive touch panel, a capacitive touch panel, an optical touch panel, an acoustic-wave touch panel, and an electromagnetic touch panel. Since the capacitive touch panel has the advantages of short response time, good reliability and high definition compared to other types of touch panels, the capacitive touch panel is broadly applied to various hand-held electronic devices.

Generally speaking, electronic products are liable to damage of electrostatic discharge (ESD) anytime during manufacturing, packaging, testing, transportation, or even the final assembly and use and thus fail to operate normally. Similarly, touch panels have the issue of ESD. For the above reason, an electrostatic protection circuit is usually arranged in a touch panel to provide protection to the touch panel. The electrostatic protection circuit is usually located in the peripheral region of the touch panel and surrounds the outermost periphery of a connecting circuit of the peripheral region. However, arranging the electrostatic protection circuit at the outermost periphery of the peripheral region increases the border size of the touch panel, which does not fulfill the current design goal of decreasing the sizes of electronic products.

SUMMARY OF THE INVENTION

A touch panel is provided, which is capable of effectively reducing or even eliminating the space occupied by the electrostatic protection circuit on a border thereof, contributing to a design with a narrow border.

A touch panel is provided, including a substrate, a touch sensing array, a first electrostatic protection circuit, a first insulating layer and a plurality of first connecting lines. The substrate has an active region and a peripheral region surrounding the active region. The touch sensing array is disposed on the substrate and located in the active region. The first electrostatic protection circuit is disposed on the substrate and located in the peripheral region. The first insulating layer is disposed on the substrate and located in the peripheral region, wherein the first insulating layer covers the first electrostatic protection circuit. The plurality of first connecting lines is disposed on the first insulating layer and coupled to the touch sensing array respectively.

According to an embodiment of the invention, the first electrostatic protection circuit surrounds at least one side edge of the substrate.

According to an embodiment of the invention, the first electrostatic protection circuit includes a closed pattern surrounding all the side edges of the substrate.

According to an embodiment of the invention, the touch panel further includes a plurality of first pads and at least one second pad. The plurality of first pads is disposed on the first insulating layer and adjacent to one side of the substrate, and the first pads are connected to the first connecting lines respectively. The second pad is disposed on the first insulating layer and adjacent to one side of the substrate, and the second pad is coupled downward to the first electrostatic protection circuit via a corresponding contact window in the first insulating layer.

According to an embodiment of the invention, the first insulating layer is a light-shielding layer.

According to an embodiment of the invention, the touch panel further includes a second pad and a plurality of second connecting lines. The second insulating layer covers the first insulating layer and the first connecting lines. The plurality of second connecting lines is located on the second insulating layer and coupled respectively to the touch sensing array.

According to an embodiment of the invention, the touch panel further includes a second insulating layer, disposed between the first insulating layer and the substrate, wherein the first electrostatic protection circuit is located between the first insulating layer and the second insulating layer.

According to an embodiment of the invention, the second insulating layer is a light-shielding layer.

According to an embodiment of the invention, the touch panel further includes a second electrostatic protection circuit, disposed on the first insulating layer.

According to an embodiment of the invention, the second electrostatic protection circuit and the first connecting lines have the same material.

According to an embodiment of the invention, the touch panel further includes a plurality of second connecting lines, disposed between the first insulating layer and the substrate, and the first electrostatic protection circuit and the second connecting lines have the same material.

According to an embodiment of the invention, a material of the second electrostatic protection circuit is metal or transparent conductive material.

According to an embodiment of the invention, an orthographic projection of the first electrostatic protection circuit on the substrate at least partially overlaps with an orthographic projection of the second electrostatic protection circuit on the substrate.

According to an embodiment of the invention, the touch panel further includes a contact window, located in the first insulating layer and coupled to the first electrostatic protection circuit and the second electrostatic protection circuit.

According to an embodiment of the invention, a material of the first electrostatic protection circuit is metal or transparent conductive material.

A touch panel is provided, including a substrate, a touch sensing array, a light-shielding layer, a first electrostatic protection circuit and a plurality of first connecting lines. The substrate has an active region and a peripheral region surrounding the active region. The touch sensing array is disposed on the substrate and located in the active region. The light-shielding layer is disposed on the substrate and located in the peripheral region. The first electrostatic protection circuit is embedded in the light-shielding layer. The first connecting lines are disposed on the light-shielding layer and coupled to the touch sensing array respectively.

According to an embodiment of the invention, the touch panel further includes an insulating layer and a plurality of second connecting lines. The insulating layer covers the light-shielding layer and the first connecting lines. The second connecting lines are located on the insulating layer and coupled respectively to the touch sensing array.

A touch panel is provided, including a substrate, a touch sensing array, a first electrostatic protection circuit, an insulating layer, a second electrostatic protection circuit and a plurality of connecting lines. The substrate has an active region and a peripheral region surrounding the active region. The touch sensing array is disposed on the substrate and located in the active region. The first electrostatic protection circuit is disposed on the substrate and located in the peripheral region. The insulating layer is disposed on the substrate and located in the peripheral region, and the insulating layer covers the first electrostatic protection circuit. The second electrostatic protection circuit is disposed on the insulating layer. The connecting lines are disposed in the peripheral region and coupled to the touch sensing array respectively.

According to an embodiment of the invention, an orthographic projection of the first electrostatic protection circuit on the substrate at least partially overlaps with an orthographic projection of the second electrostatic protection circuit on the substrate.

According to an embodiment of the invention, the touch panel further includes a contact window, located in the insulating layer and coupled to the first electrostatic protection circuit and the second electrostatic protection circuit.

Based on the above, the first connecting lines in the touch panel of the application is disposed on the first insulating layer in the peripheral region, and the first electrostatic protection circuit is disposed in the first insulating layer, wherein the first insulating layer may be a light-shielding layer. By disposing the first electrostatic protection layer in the light-shielding layer, the border size of the touch panel is effectively reduced. In addition, a material of the first electrostatic protection circuit may be a metal, thereby increasing the light-shielding effect of the light-shielding layer. On the other hand, the touch panel may adopt a design of double-layer electrostatic protection circuit, wherein the first insulating layer is located between the first electrostatic protection circuit and the second electrostatic protection circuit. With the design of the double-layer electrostatic protection circuit, a width of each electrostatic protection circuit is respectively decreased to effectively reduce the border size of the touch panel under the premise that the electrostatic protection function of the touch panel is maintained.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the application.

DESCRIPTION OF THE EMBODIMENTS

To make the above features and advantages of the invention more comprehensible, several embodiments accompanied with drawings are described in detail as follows.

Figure 1:
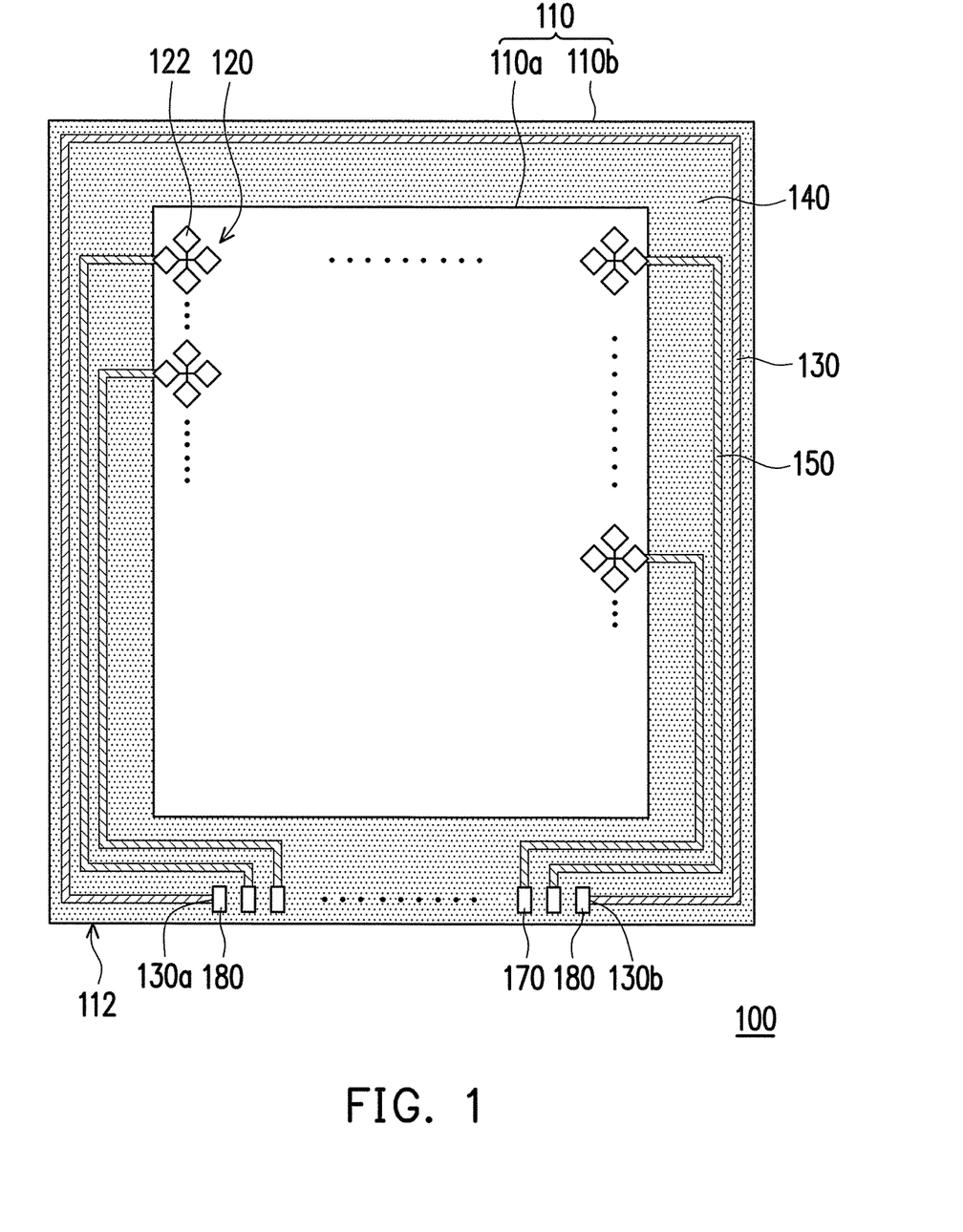
FIG. 1 is a schematic top-view of a touch panel according to an embodiment of the invention.
Figure 2:
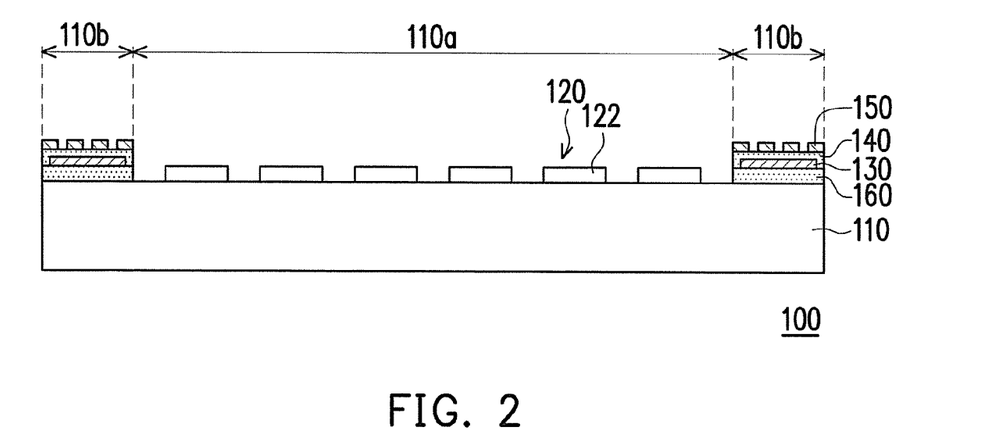
FIG. 2 is a schematic cross-sectional view of the touch panel of FIG. 1.

FIG. 1 is a schematic top-view of a touch panel according to an embodiment of the invention. FIG. 2 is a schematic cross-sectional view of the touch panel of FIG. 1. Referring to both FIGS. 1 and 2, a touch panel 100 includes a substrate 110, a touch sensing array 120, a first electrostatic protection circuit 130, a first insulating layer 140 and a plurality of first connecting lines 150. The substrate 110 has an active region 110a and a peripheral region 110b surrounding the active region 110a. The substrate 110 is, for example, a glass substrate, a plastic substrate, a flexible substrate, or other substrates.

The touch sensing array 120 is disposed on the substrate 110 and located in the active region 110a. The first electrostatic protection circuit 130 is disposed on the substrate 110 and located in the peripheral region 110b. The first insulating layer 140 is disposed on the substrate 110 and located in the peripheral region 110b, wherein the first insulating layer 140 covers the first electrostatic protection circuit 130. The plurality of first connecting lines 150 is disposed on the first insulating layer 140 and coupled to the touch sensing array 120 respectively.

It needs to be explained that the touch sensing array 120 of the touch panel 100 includes a plurality of touch sensing patterns 122. In addition, the touch sensing array 120 may be a single-layer structure or a double-layer structure, and the touch sensing patterns 122 of the touch sensing array 120 may adopt a coplanar or non-coplanar design.

In the present embodiment, by disposing the first electrostatic protection circuit 130 in the first insulating layer 140 of the peripheral region 110b instead of surrounding the outermost periphery of the first connecting lines 150, the border size of the touch panel 100 is effectively reduced.

In the present embodiment, the first electrostatic protection circuit 130 surrounds all the sides of the substrate 110, and the first electrostatic protection circuit 130 has an opening on a side edge 112 of the substrate 110. It needs to be explained that the application does not limit on the way that the first electrostatic protection circuit 130 surrounds the substrate 110, and the first electrostatic protection circuit 130 may also surround merely one side of the substrate 110. In addition, as illustrated in FIG. 1, the touch panel 100 further includes a plurality of first pads 170 and two second pads 180. The first pads 170 are disposed on the first insulating layer 140 and adjacent to one side 112 of the substrate 110, and the first pads 170 are connected to the first connecting lines 150 respectively. The two second pads 180 are connected respectively to two ends 130a and 130b of the first electrostatic protection circuit 130. The second pads 180 are disposed on the first insulating layer 140 and adjacent to one side 112 of the substrate 110, and the second pads 180 are coupled downward to the first electrostatic protection circuit 130 via a corresponding contact window in the first insulating layer 140. The touch panel 100 may be electrically connected to the first pads 170 and the second pads 180 via a flexible circuit board (not shown), for example, to achieve the function of transmitting signals. It needs to be explained that in another embodiment that is not shown, the two ends 130a and 130b of the first electrostatic protection circuit 130 may not connect to the second pads 180.

In the present embodiment, the first insulating layer 140 is a light-shielding layer. In addition, a material of the first electrostatic protection circuit 130 is metal or transparent conductive material, wherein the transparent conductive material is, for example, Indium Tin Oxide (ITO) or Indium Zinc Oxide (IZO).

The touch panel 100 further includes a second insulating layer 160, disposed between the first insulating layer 140 and the substrate 110, wherein the first electrostatic protection circuit 130 is located between the first insulating layer 140 and the second insulating layer 160. In the present embodiment, the first insulating layer 140 and the second insulating layer 160 are both light-shielding layers, and the color of each light-shielding layer may be black, white or any desired border color. It needs to be explained that in the present embodiment, the first insulating layer 140 and the second insulating layer 160 are made of the same material, and are substantively the same light-shielding layer, and the first electrostatic protection circuit 130 is embedded in the light-shielding layer. The first insulating layer 140 and the second insulating layer 160 may shield the first connecting lines 150 of the peripheral region 100b of the touch panel 100. The present embodiment reduces the border size of the touch panel 100 by embedding the first electrostatic protection circuit 130 in the light-shielding layer instead of surrounding the outermost periphery of the first connecting lines 150.

The reference numerals and part of the contents in the previous embodiment are used in the following embodiments, wherein identical reference numerals indicate identical or similar components, and repeated description of the same technical contents is omitted. For a detailed description of the omitted parts, reference can be found in the previous embodiment, and no repetition is provided in the following embodiments.

Figure 3:
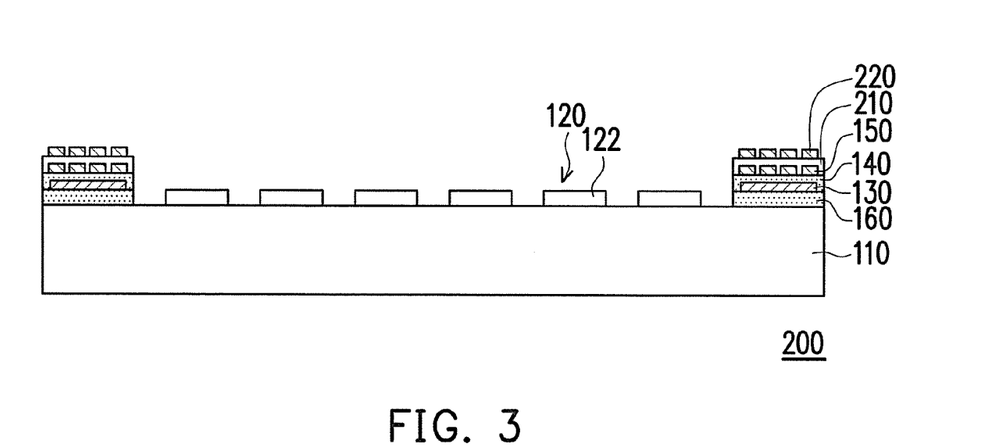
FIG. 3 is a schematic cross-sectional view of a touch panel according to another embodiment of the invention.

FIG. 3 is a schematic cross-sectional view of a touch panel according to another embodiment of the invention. The embodiment of FIG. 3 is similar to the embodiment of FIG. 1, and the difference between both lies mainly in that the touch panel 200 of FIG. 3 further includes a third insulating layer 210 and a plurality of second connecting lines 220. The third insulating layer 210 covers the first insulating layer 140 and the first connecting lines 150. The plurality of second connecting lines 220 is located on the third insulating layer 210 and coupled respectively to the touch sensing array 120. In other words, in the present embodiment, connecting lines of the touch panel 200 may be arranged on different films. As shown in FIG. 3, the first connecting lines 150 and the second connecting lines 220 are non-coplanar.

It needs to be explained that the touch sensing array 120 of the application may be a single-layer structure or a double-layer structure, and the touch sensing patterns 122 of the touch sensing array 120 may adopt a coplanar or non-coplanar design. In addition, the first connecting lines 150 and the second connecting lines 220 may similarly be single-layer or double-layer structures. More specifically, the first connecting lines 150 and the second connecting lines 220 may be formed by patterning a same metal layer or by patterning metal layers located above and below the insulating layer respectively.

Figure 4:
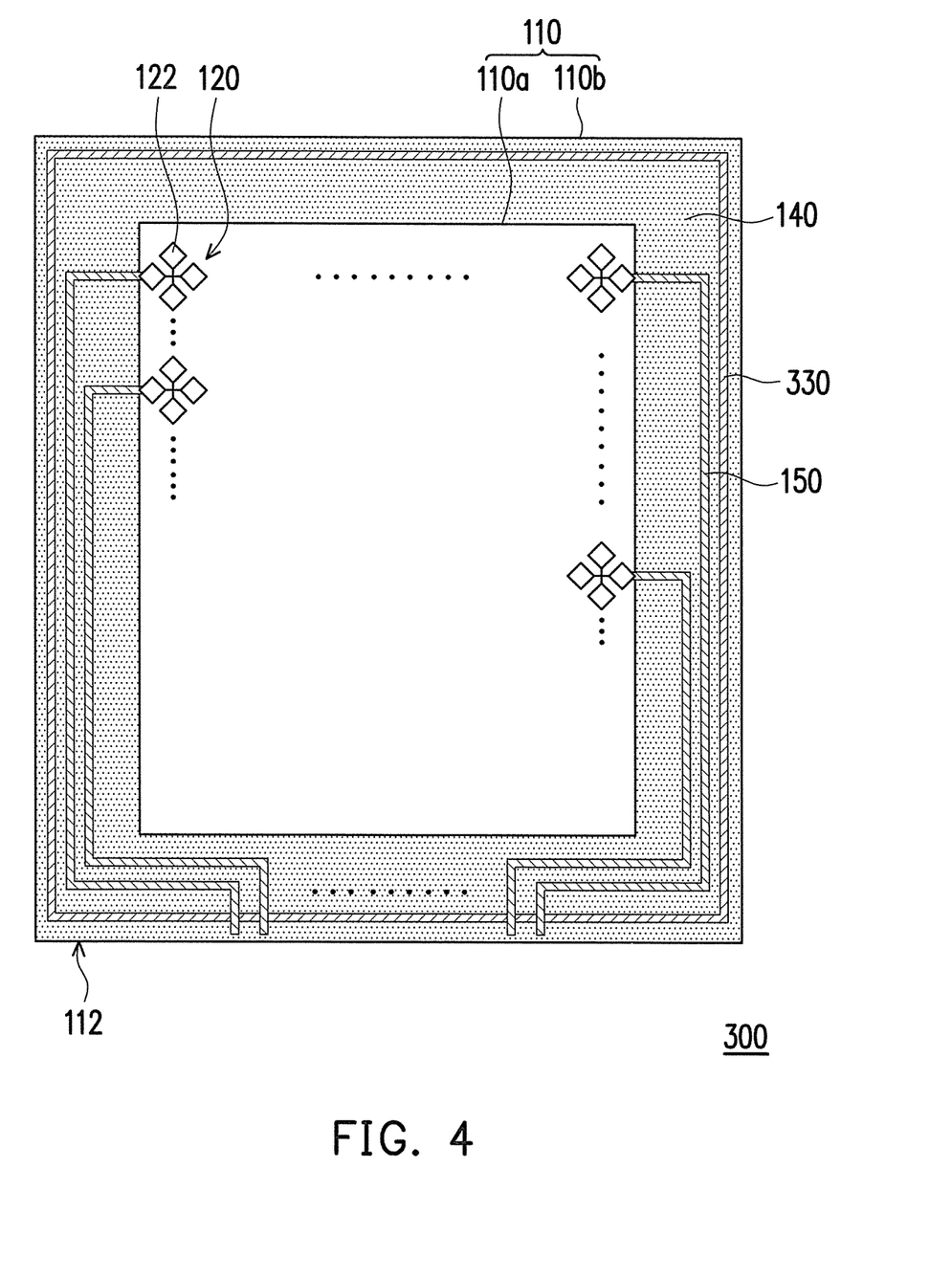
FIG. 4 is a schematic top-view of a touch panel according to another embodiment of the invention.

FIG. 4 is a schematic top-view of a touch panel according to another embodiment of the invention. The embodiment of FIG. 4 is similar to the embodiment of FIG. 1, and the difference between both lies mainly in that in the present embodiment, the first electrostatic protection circuit 330 includes a closed pattern surrounding all the sides of the substrate 110.

Figure 5:
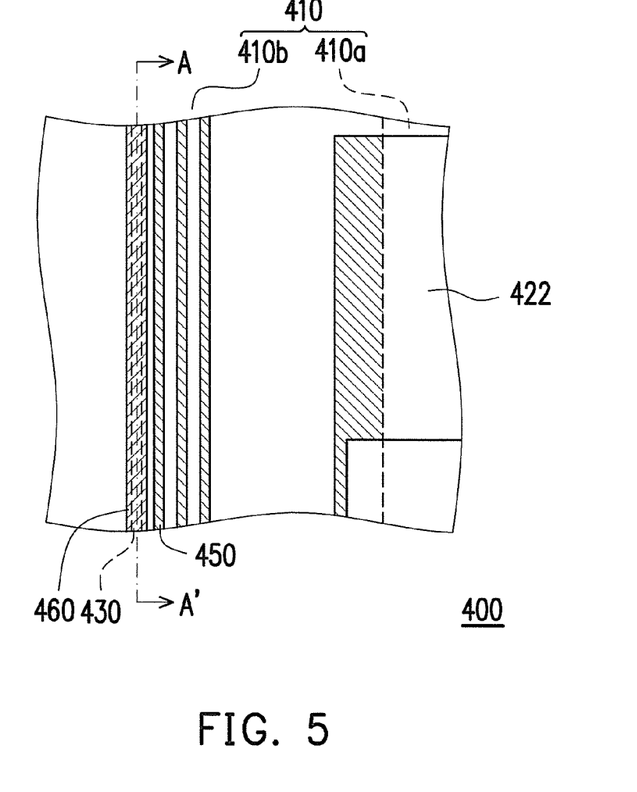
FIG. 5 is a schematic partial top-view of a touch panel according to another embodiment of the invention.
Figure 6:
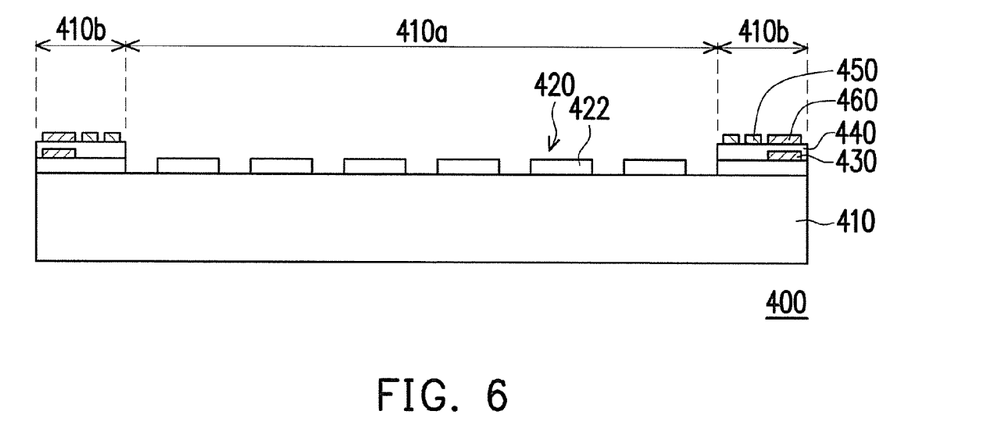
FIG. 6 is a schematic cross-sectional view of the touch panel of FIG. 5.

FIG. 5 is a schematic partial top-view of a touch panel according to another embodiment of the invention. FIG. 6 is a schematic cross-sectional view of the touch panel of FIG. 5. Referring to both FIGS. 5 and 6, a touch panel 400 includes a substrate 410, a touch sensing array 420, a first electrostatic protection circuit 430, a first insulating layer 440, a plurality of first connecting lines 450 and a second electrostatic protection circuit 460. The substrate 410 has an active region 410a and a peripheral region 410b surrounding the active region 410a. The touch sensing array 420 is disposed on the substrate 410 and located in the active region 410a. The first electrostatic protection circuit 430 is disposed on the substrate 410 and located in the peripheral region 410b. The first insulating layer 440 is disposed on the substrate 410 and located in the peripheral region 410b, wherein the first insulating layer 440 covers the first electrostatic protection circuit 430. The second electrostatic protection circuit 460 is disposed on the first insulating layer 440. The plurality of connecting lines 450 is disposed in the peripheral region and coupled to the touch sensing array 420 respectively.

In the present embodiment, the touch panel 400 includes two electrostatic protection circuits 430 and 460 located on different films of the touch panel 400, and the electrostatic protection circuits 430 and 460 are non-coplanar. Thereby, under the premise that the electrostatic protection function of the touch panel 400 is maintained, a width of each of the electrostatic protection circuits 430 and 460 is thinned. When the widths of the electrostatic protection circuits 430 and 460 are thinned, the border size of the touch panel 400 is reduced.

In addition, in the present embodiment, an orthographic projection of the first electrostatic protection circuit 430 on the substrate 410 completely overlaps with an orthographic projection of the second electrostatic protection circuit 460 on the substrate 410. Thereby, the border size of the touch panel 400 is further reduced.

In the present embodiment, the touch sensing array 420 of the touch panel 400 may be a single-layer or double-layer structure, and a touch sensing pattern 422 of the touch sensing array may adopt a coplanar or non-coplanar design. Relevant descriptions may be referred to in the embodiment of FIG. 3 and will not be repeated herein. In addition, in the present embodiment, the second electrostatic protection circuit 460 and the first connecting lines 450 have the same material, such as metal or transparent conductive material, and the second electrostatic protection circuit 460 and the first connecting lines 450 may be manufactured in the same manufacturing processing step or in two different manufacturing processing steps. However, the application is not limited thereto. The second electrostatic protection circuit 460 and the first connecting lines 450 may be made of different materials. For example, the second electrostatic protection circuit 460 may be made of transparent conductive material, and the first connecting lines 450 may be made of metal. Alternatively, the first connecting lines 450 may be made of transparent conductive material, and the second electrostatic protection circuit 460 may be made of metal.

The reference numerals and part of the contents in the previous embodiment are used in the following embodiments, wherein identical reference numerals indicate identical or similar components, and repeated description of the same technical contents is omitted. For a detailed description of the omitted parts, reference can be found in the previous embodiment, and no repetition is provided in the following embodiments.

Figure 7:
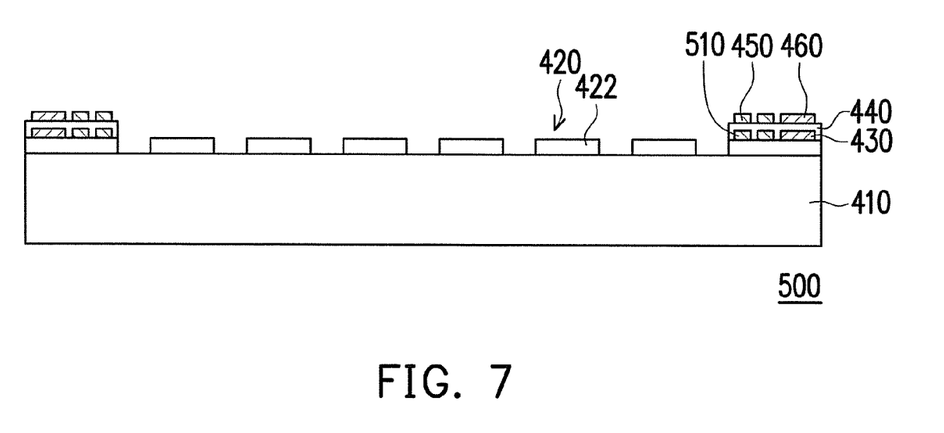
FIG. 7 is a schematic cross-sectional view of a touch panel according to another embodiment of the invention.

FIG. 7 is a schematic cross-sectional view of a touch panel according to another embodiment of the invention. The embodiment of FIG. 7 is similar to the embodiment of FIG. 5, and the difference between both lies in that the touch panel 500 of FIG. 7 further includes a plurality of second connecting lines 510 disposed between the first insulating layer 440 and the substrate 410, and the first electrostatic protection circuit 430 and the second connecting lines 510 has the same material, such as metal or transparent conductive material.

It is for certain that when there are a first electrostatic protection circuit and a second electrostatic protection circuit in different layers, it may be chosen to manufacture the first electrostatic protection circuit and the second electrostatic protection circuit together with first connecting lines or second connecting lines respectively. With respect to the embodiment as shown in FIG. 7, the first electrostatic protection circuit 430 and the second connecting lines 510 may be made from a same metal layer, and the second electrostatic protection circuit 460 and the first connecting lines 450 may be made from a same metal layer. In addition, in other embodiments, it may be chosen to manufacture the first electrostatic protection circuit and the second electrostatic protection circuit by means of an additional manufacturing process. Furthermore, in the present embodiment, the touch sensing pattern 422 is a structure made from a single-layer film, wherein it may be chosen to manufacture the touch sensing pattern 422 together with the first electrostatic protection circuit 430 and the second connecting lines 510, or together with the second electrostatic protection circuit 460 and the first connecting lines 450.

It needs to be explained that although the present embodiment describes the application with the example that the touch panel 500 includes the first connecting lines 450 and the second connecting lines 510, the touch panel 500 may also include merely the first connecting lines 450 or merely the second connecting lines 510. In other words, the connecting lines may be located in different desired films or the same desired layer.

Figure 8A:
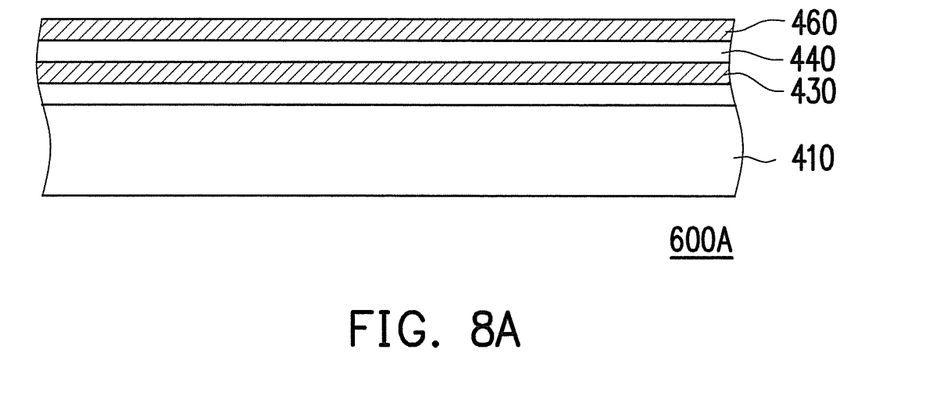
FIG. 8A is a schematic cross-sectional view of a touch panel according to another embodiment of the invention.
Figure 8B:
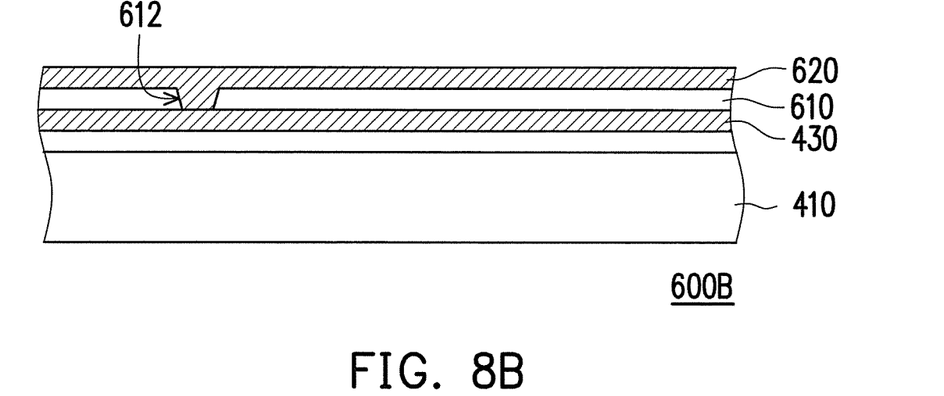
FIG. 8B is a schematic cross-sectional view of a touch panel according to another embodiment of the invention.

FIG. 8A is a schematic cross-sectional view of a touch panel according to another embodiment of the invention, wherein FIG. 8A illustrates a cross-sectional view along a cutting line AA' in FIG. 5. As shown in FIG. 8A, there is no electrical connection between the first electrostatic protection circuit 430 and the second electrostatic protection circuit 460. FIG. 8B is a schematic cross-sectional view of a touch panel according to another embodiment of the invention, wherein FIG. 8B illustrates a cross-sectional view along a cutting line AA' in FIG. 5. The embodiment of FIG. 8B is similar to the embodiment of FIG. 8A, and the difference between both lies mainly in that a touch panel 600B in FIG. 8B further includes a contact window 612 located in the first insulating layer 610 and coupled to the first electrostatic protection circuit 430 and a second electrostatic protection circuit 620. As shown in FIG. 8B, the contact window 612 exposes part of the first electrostatic protection circuit 430, and part of the second electrostatic protection circuit 620 is connected to the contact window 612 to be coupled to the first electrostatic protection circuit 430, thereby adjusting the effect of static protection.

Figure 8C:
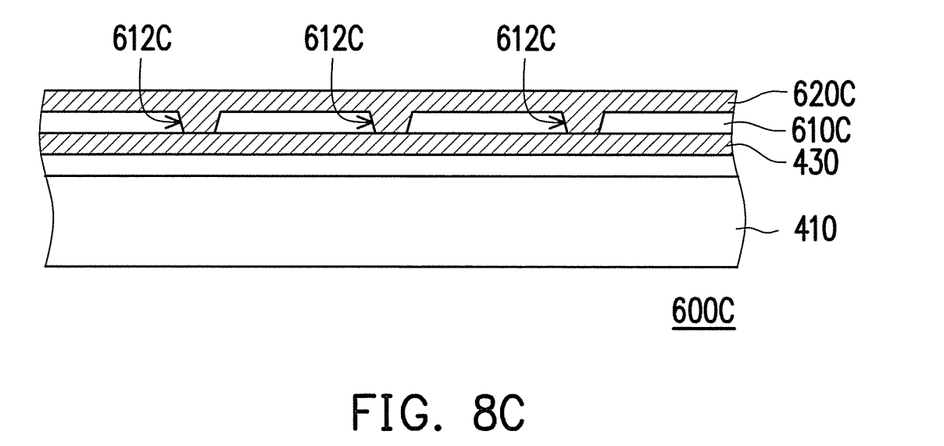
FIG. 8C is a schematic cross-sectional view of a touch panel according to another embodiment of the invention.

FIG. 8C is a schematic cross-sectional view of a touch panel according to another embodiment of the invention, wherein FIG. 8C illustrates a cross-sectional view along a cutting line AA' in FIG. 5. The embodiment of FIG. 8C is similar to the embodiment of FIG. 8B, and the difference between both lies mainly in that a touch panel 600C of FIG. 8C includes a plurality of touch windows 612C located in a first insulating layer 610C. In other words, the application does not limit on the number of contact windows.

Figure 9:
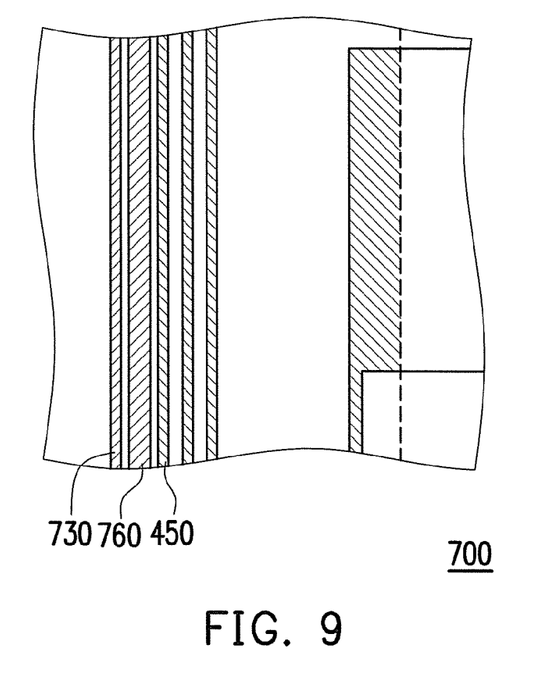
FIG. 9 is a schematic partial top-view of a touch panel according to another embodiment of the invention.
Figure 10:
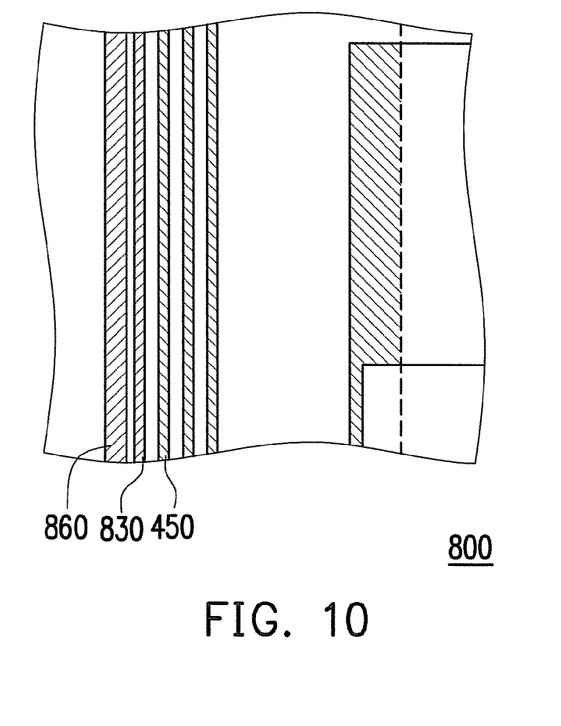
FIG. 10 is a schematic partial top-view of a touch panel according to another embodiment of the invention.
Figure 11:
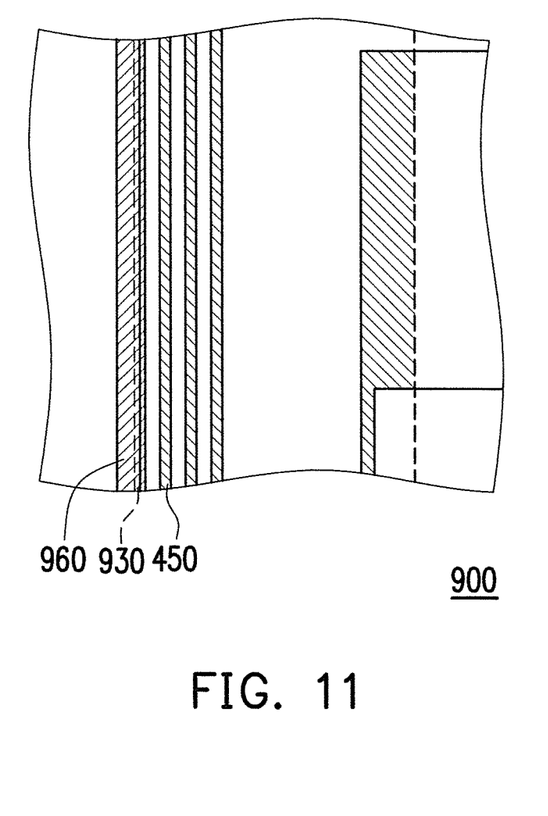
FIG. 11 is a schematic partial top-view of a touch panel according to another embodiment of the invention.

FIG. 9 is a schematic partial top-view of a touch panel according to another embodiment of the invention. The embodiment of FIG. 9 is similar to the embodiment of FIG. 5, and the difference between both lies mainly in that a first electrostatic protection circuit 730 does not overlap with a second electrostatic protection circuit 760. In addition, the second electrostatic protection circuit 760 is located between the first electrostatic protection circuit 730 and the first connecting lines 450. FIG. 10 is a schematic partial top-view of a touch panel according to another embodiment of the invention. The embodiment of FIG. 10 is similar to the embodiment of FIG. 5, and the difference between both lies mainly in that a first electrostatic protection circuit 830 does not overlap with a second electrostatic protection circuit 860. In addition, the first electrostatic protection circuit 830 is located between the second electrostatic protection circuit 860 and the first connecting lines 450. FIG. 11 is a schematic partial top-view of a touch panel according to another embodiment of the invention. The embodiment of FIG. 11 is similar to the embodiment of FIG. 5, and the difference between both lies mainly in that an orthographic projection of a first electrostatic protection circuit 930 on the substrate partially overlaps with an orthographic projection of a second electrostatic protection circuit 960 on the substrate. In other words, the relative positions between the first electrostatic protection circuit, the second electrostatic protection circuit and the first connecting lines may be adjusted as desired, and the orthographic projection of the first electrostatic protection circuit on the substrate and the orthographic projection of the second electrostatic protection circuit on the substrate may be non-overlapping, partially overlapping or completely overlapping.

In light of the above, the first connecting lines of the touch panel of the application are disposed on the first insulating layer of the peripheral region, and the first electrostatic protection circuit is disposed on the first insulating layer of the peripheral region, wherein the first insulating layer may be a light-shielding layer. By disposing the first electrostatic protection circuit in the light-shielding layer, the border size of the touch panel is effectively reduced. In addition, a material of the first electrostatic protection circuit may be a metal, and thereby the light-shielding effect of the light-shielding layer is increased.

On the other hand, the touch panel may adopt a design of double-layer electrostatic protection circuit, wherein the first insulating layer is located between the first electrostatic protection circuit and the second electrostatic protection circuit. With a design of double-layer electrostatic protection circuit, the width of each electrostatic protection circuit is decreased respectively to effectively reduce the border size of the touch panel under the premise that the electrostatic protection function of the touch panel is maintained. In addition, the orthographic projection of the first electrostatic protection circuit on the substrate and the orthographic projection of the second electrostatic protection circuit on the substrate may be partially or completely overlapping, which further reduces the border size of the touch panel.

Although the invention has been described with reference to the above embodiments, it will be apparent to one of ordinary skill in the art that modifications to the described embodiments may be made without departing from the spirit and scope of the invention. Accordingly, the scope of the invention will be defined by the attached claims and not by the above detailed descriptions.

What is claimed is:

1. A touch panel, comprising:
   a substrate, having an active region and a peripheral region surrounding the active region;
   a touch sensing array, disposed on the substrate and located in the active region;
   a first electrostatic protection circuit, disposed on the substrate and located in the peripheral region;
   a first insulating layer, disposed on the substrate and located in the peripheral region, the first insulating layer covering the first electrostatic protection circuit;
   a plurality of first connecting lines, disposed on the first insulating layer and coupled to the touch sensing array respectively; and
   a second insulating layer, disposed between the first insulating layer and the substrate, the first electrostatic protection circuit being located between the first insulating layer and the second insulating layer.

2. The touch panel as claimed in claim 1, wherein the first electrostatic protection circuit surrounds at least one side edge of the substrate.

3. The touch panel as claimed in claim 1, wherein the first electrostatic protection circuit comprises a closed pattern surrounding all the side edges of the substrate.

4. The touch panel as claimed in claim 1, further comprising:
   a plurality of first pads, disposed on the first insulating layer and adjacent to one side of the substrate, the first pads being connected to the first connecting lines respectively; and
   at least one second pad, disposed on the first insulating layer and adjacent to the side of the substrate, the at least one second pad being coupled downward to the first electrostatic protection circuit via a corresponding contact window in the first insulating layer.

5. The touch panel as claimed in claim 1, wherein the first insulating layer is a light-shielding layer.

6. The touch panel as claimed in claim 1, further comprising:
   a third insulating layer, covering the first insulating layer and the first connecting lines; and
   a plurality of second connecting lines, disposed on the third insulating layer and coupled to the touch sensing array respectively.

7. The touch panel as claimed in claim 1, wherein the second insulating layer is a light-shielding layer.

8. The touch panel as claimed in claim 1, further comprising a second electrostatic protection circuit, disposed on the first insulating layer.

9. The touch panel as claimed in claim 8, wherein the second electrostatic protection circuit and the first connecting lines have the same material.

10. The touch panel as claimed in claim 8, further comprising a plurality of second connecting lines, disposed between the first insulating layer and the substrate, wherein the first electrostatic protection circuit and the second connecting lines have the same material.

11. The touch panel as claimed in claim 8, wherein a material of the second electrostatic protection circuit is metal or transparent conductive material.

12. The touch panel as claimed in claim 8, wherein an orthographic projection of the first electrostatic protection circuit on the substrate at least partially overlaps with an orthographic projection of the second electrostatic protection circuit on the substrate.

13. The touch panel as claimed in claim 8, further comprising a contact window, located in the first insulating layer and coupled to the first electrostatic protection circuit and the second electrostatic protection circuit.

14. The touch panel as claimed in claim 1, wherein a material of the first electrostatic protection circuit is metal or transparent conductive material.

15. A touch panel, comprising:
   a substrate, having an active region and a peripheral region surrounding the active region;
   a touch sensing array, disposed on the substrate and located in the active region;
   a light-shielding layer, disposed on the substrate and located in the peripheral region;
   a first electrostatic protection circuit, embedded in the light-shielding layer, wherein the light-shielding layer is located on both of an upper side and a lower side of the first electrostatic protection circuit; and
   a plurality of first connecting lines, disposed on the light-shielding layer and coupled to the touch sensing array respectively.

16. The touch panel as claimed in claim 15, further comprising:
   an insulating layer, covering the light-shielding layer and the first connecting lines; and
   a plurality of second connecting lines, disposed on the insulating layer and coupled to the touch sensing array respectively.

17. A touch panel, comprising: a substrate, having an active region and a peripheral region surrounding the active region; a touch sensing array, disposed on the substrate and located in the active region; a first electrostatic protection circuit, disposed on the substrate and located in the peripheral region; an insulating layer, disposed on the substrate and located in the peripheral region, wherein, the first electrostatic protection circuit is embedded in the insulating layer, and the insulating layer is located on both of an upper side and a lower side of the first electrostatic protection circuit; a second electrostatic protection circuit, disposed on the insulating layer; and a plurality of connecting lines, disposed in the peripheral region and coupled to the touch sensing array respectively.

18. The touch panel as claimed in claim 17, wherein an orthographic projection of the first electrostatic protection circuit on the substrate at least partially overlaps with an orthographic projection of the second electrostatic protection circuit on the substrate.

19. The touch panel as claimed in claim 17, further comprising a contact window, located in the insulating layer and coupled to the first electrostatic protection circuit and the second electrostatic protection circuit.

* * * * *